(12) United States Patent
Gordon et al.

(10) Patent No.: US 7,423,095 B2
(45) Date of Patent: Sep. 9, 2008

(54) COATING COMPOSITIONS CONTAINING AMINOFUNCTIONAL SILICONE RESINS

(75) Inventors: Glenn Gordon, Midland, MI (US); John Benard Horstman, Midland, MI (US); Russell King, Midland, MI (US); Randall Schmidt, Midland, MI (US); Gary Wieber, Midland, MI (US); Gerald Lawrence Witucki, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 444 days.

(21) Appl. No.: 10/564,611

(22) PCT Filed: Jul. 13, 2004

(86) PCT No.: PCT/US2004/022582

§ 371 (c)(1),
(2), (4) Date: Jan. 12, 2006

(87) PCT Pub. No.: WO2005/010078

PCT Pub. Date: Feb. 3, 2005

(65) Prior Publication Data

US 2006/0205868 A1    Sep. 14, 2006

(51) Int. Cl.
*D06M 15/643* (2006.01)

(52) U.S. Cl. .................. 525/474; 525/479; 528/38; 528/43; 528/25; 106/287.11; 106/287.13

(58) Field of Classification Search .............. None
See application file for complete search history.

(56) References Cited

U.S. PATENT DOCUMENTS

| | | | |
|---|---|---|---|
| 3,166,527 A | 1/1965 | Ender | |
| 3,890,269 A | 6/1975 | Martin | |
| 4,125,510 A | 11/1978 | Antonen | |
| 4,157,357 A | 6/1979 | Mine et al. | |
| 4,202,807 A | 5/1980 | Moretto et al. | |
| 4,234,697 A | 11/1980 | Homan et al. | |
| 4,657,986 A | 4/1987 | Isayama et al. | |
| 4,722,951 A | 2/1988 | Yoshioka et al. | |
| 4,795,680 A | 1/1989 | Rich et al. | |
| 4,857,608 A | 8/1989 | Herzig et al. | |
| 4,877,822 A | 10/1989 | Itoh et al. | |
| 4,935,482 A | 6/1990 | Decker et al. | |
| 4,972,029 A | 11/1990 | Herzig et al. | |
| 4,988,778 A | 1/1991 | Chang et al. | |
| 5,013,577 A | 5/1991 | Wright et al. | |
| 5,102,960 A | 4/1992 | Imai et al. | |
| 5,110,891 A | 5/1992 | Cifuentes et al. | |
| 5,126,126 A | 6/1992 | Varaprath et al. | |
| 5,135,993 A | 8/1992 | Decker et al. | |
| 5,152,984 A | 10/1992 | Varaprath et al. | |
| 5,262,507 A | 11/1993 | Decker et al. | |
| 5,283,279 A | 2/1994 | Hara et al. | |
| 5,290,882 A | 3/1994 | Shiobara et al. | |
| 5,362,821 A | 11/1994 | Decker et al. | |
| 5,378,532 A | 1/1995 | Decker et al. | |
| 5,399,652 A | 3/1995 | Bindl et al. | |
| 5,405,688 A | 4/1995 | Decker et al. | |
| 5,431,765 A | 7/1995 | Decker et al. | |
| 5,466,323 A | 11/1995 | Decker et al. | |
| 5,489,482 A | 2/1996 | Minemura et al. | |
| 5,516,858 A | 5/1996 | Morita et al. | |
| 5,561,174 A | 10/1996 | Saito et al. | |
| 5,804,616 A | 9/1998 | Mowrer et al. | |
| 5,840,806 A | 11/1998 | Komazaki et al. | |
| 5,840,951 A | 11/1998 | Hierstetter et al. | |
| 5,952,439 A | 9/1999 | Morita et al. | |
| 6,071,990 A | 6/2000 | Yip et al. | |

OTHER PUBLICATIONS

R. Tamaki, J. Choi, and R.M. Lain, A Polyimide Nanocomposite from Octa(aminophenyl)silsesquioxane, Chemical Materials, 2003, pp. 793-797, vol. 15.

C. Li and G. Wilkes, Silicone/Amine Resin Hybrid Materials as Abrasion Resistant Coatings, Chemical Materials. 2001. pp. 3663-3668. vol. 13.

*Primary Examiner*—Marc S Zimmer
(74) *Attorney, Agent, or Firm*—Patricia M. Scaduto

(57) ABSTRACT

This invention relates to a coating composition comprising (A) 100 weight parts of a compound containing at least one acrylate group or a compound containing at least one isocyanate group; (B) at least one aminofanctional silicone resin; (C) up to 300 weight parts of at least one organic hardener; and (D) up to 5 weight parts of at least one cure rate modifier. The coating compositions of this invention are useful as a stand alone coating or as ingredients in flame retardant coating compositions, fabric or fiber coating compositions, UV resistant coating compositions, paint formulations, powder coatings, architectural coatings and adhesives. The coating compositions of this invention have enhanced thermal stability, particularly when used in coatings, paints, powder coatings, architectural coatings, and adhesives.

19 Claims, No Drawings

COATING COMPOSITIONS CONTAINING AMINOFUNCTIONAL SILICONE RESINS

CROSS REFERENCE TO RELATED APPLICATIONS

This application is a U.S. national stage filing under 35 U.S.C. §371 of PCT Application No. PCT/US2004/022582 filed on Jul. 13, 2004, currently pending. PCT Application No. PCT/US2004/022582 is hereby incorporated by reference.

Silicone resins are known in the art to have exceptional thermal stability and weatherability including low water absorption. However, their poor toughness, adhesion and dimensional stability (low Tg, high CTE) limit their utility. Acrylated urethane compounds and acrylated epoxy compounds exhibit very good toughness, solvent resistance, adhesion and dimensional stability but suffer from marginal thermal stability and weatherability. This invention relates to the use of aminofunctional silicone resins that are co-reacted with acrylated oligomers or isocyanates to obtain fast room temperature curing, tough., high temperature resistant coating compositions. Compositions comprising aminofunctional silicones and compounds containing acrylate groups or isocyanate groups have been disclosed in the art. For example, in U.S. Pat. No. 5,399,652 is disclosed a crosslinkable composition comprising (A) an organopolysiloxane which has at least one monovalent SiC-bonded radical containing primary and/or secondary amino groups, and (B) a crosslinking component selected from an alkoxysilane and/or siloxane which contains at least one carboxylic acid anhydride group. The crosslinkable composition and/or the resultant organopolysiloxane compound obtained from the reaction of organopolysiloxane (A) and crosslinking component (B) can be used to treat organic fibers and textile structures produced therefrom. It is also disclosed that this composition can be in the form of an emulsion or microemulsion.

In U.S. Pat. No. 4,935,482 is disclosed polysiloxane-polyurea block copolymers prepared from isocyanate and aminophenoxy functional polyorganosiloxanes. These block copolymers are hydrolytically stable and exhibit improved thermal stability compared to aminoalkyl functional polyorganosiloxanes.

In U.S. Pat. No. 4,988,778 is disclosed a stable polyamine-functional silane resin which is prepared by reacting (i) an aminoalkoxysilane and (ii) a hydroxy- and amine-functional compound. Also disclosed is a curable composition comprising the stable polyamine-functional silane resin and a curable material containing a functional group which is an epoxy group, an acrylic group, an isocyanate group or a mixture thereof.

Aminofunctional silicone resins react with epoxy compounds at room temperature at a slow rate. Although this provides suitible pot life it often limits the applications to only those that can afford long drying times or heating in an oven. Organic amines are commonly used as hardeners in polyurea systems. However, these materials are limited to low use temperatures due to poor thermal stability solution: Acrylated oligomers (Michael Addition cure) and isocyanates (polyureas) provide reactive organic materials with enhanced reactivity with aminofunctional silicone resins and hence much shorter tack free times. The use of a siloxane resin hardener increases the thermal stability of the material.

Thus this invention relates to a coating composition comprising (A) 100 weight parts of (i) at least one compound containing at least one acrylate group or (ii) at least one compound containing at least one isocyanate group; (B) 3-300 weight parts of at least one aminofunctional silicone resin comprising the units:

$(R_3SiO_{1/2})_a$         (i)

$(R_2SiO_{2/2})_b$         (ii)

$(RSiO_{3/2})_c$         (iii) and $(SiO_{4/2})_d$         (iv)

wherein R is independently an alkyl group, an aryl group, or an aminofunctional hydrocarbon group, a has a value of less than 0.4, b has a value of zero or greater than zero, c has a value of greater tn zero to 0.7, d has a value of less than 0.3, the value of $a+b+c+d=1$, with the provisos that 3 to 50 mole percent of silicon atoms contain aminofunctional hydrocarbon groups in units (i), (ii) or (iii), the —NH— equivalent weight of the aminofunctional silicone resin is from 100 to 1500, alternatively from 100 to 1000, alternatively from 150 to 350, the aminofunctional silicone resin is in the form of a neat liquid, solution, or meltable solid, greater than 20 weight percent of unit (ii) is present in the aminofunctional silicone resin, less than 10 weight percent of unit (ii) are $Me_2SiO_{2/2}$ units in the aminofunctional silicone resin, and greater than 50 weight percent of silicon-bonded R groups are silicon-bonded aryl groups, and at least 30 weight percent of all silicon atoms contain an aryl group; (C) up to 300 weight parts of at least one organic hardener; and (D) up to 5 weight parts of at least one cure rate modifier.

The —NH— equivalent weight as used herein means the weight of material that contains one atomic weight of amine hydrogen.

The compounds containing at least one acrylate group of Component (A) are illustrated by urehane acrylates, acrylated fluorocarbons, soybean oil acrylates, epoxy acrylates, pentaerythritol triacrylate, or materials which contain a mixture of the groups such as the epoxy and acrylate group such as glycidyl acrylate. The compounds containing at least one isocyanate group of Component (A) are illustrated by isophorone diisocyanate trimers, isophorone diisocyanate, toluene diisocyanate, polyisocyanates, tetramethylxylylene diisocyanate, phenylene diisocyanate, xylene diisocyanate, 1,5-naphthalene diisocyanate, chlorophenylene 2,4-diisocyanate, bitoluene diisocyanate, dianisidine diisocyanate, toluidine diisocyanate and alkylated benzene diisocyanates generally; methylene-interrupted aromatic diisocyanates such as methylene-diphenyl-diisocyanate, especially the 4,4'-isomer (MDI) including alkylated analogs such as 3,3'-dimethyl-4'-diphenyl-methane diisocyanate; such hydrogenated materials as cyclohexylene diisocyanate, 4,4'-methylenedicydohexyl diisocyanate (H12MDI); mixed aralkyl diisocyanates such as the tetramethylxylyl diisocyanates, OCN—C(CH3)2—C6 H4 C(CH3)2—NCO, and the diisocyanate popularly referred to as isophorone diisocyanate, which is 3,3,5-trimethyl-5-isocyanato-methylcyclohexyl isocyanate; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate, and 2-methyl-1,5-pentamethylene diisocyanate. The above isocyanates can be used alone or in combination.

Commercially available materials suitable as component (A) are illustrated by CN 975 a hexafunctional aromatic urethane acrylate sold by Sartomer (Exton, Pa.); Tolonate XIDT 70SB an isophorone diisocyanate trimer (70% solids, 12.3 wt % NCO) sold by Rhodia (Cranbury, N.J.); TA-N an acrylated fluorocarbon sold by DuPont (Wilmington, Del.); CN 111 an epoxidized soybean oil acrylate sold by Sartomer (Exton, Pa.), and DESMODUR N-100 polyisocyanate (available from Mobay Corp.).

In Component (B), the aminofunctional silicone resin, the alkyl groups of R are illustrated by methyl, ethyl, propyl, butyl, hexyl, octyl, decyl, dodecyl, hexadecyl, and octadecyl with the alkyl group typically being methyl. The aryl groups are illustrated by phenyl, naphthyl, benzyl, tolyl, xylyl, xenyl, methylphenyl, 2-phenylethyl, 2-phenyl-2-methylethyl, chlorophenyl, bromophenyl and fluorophenyl with the aryl group typically being phenyl. The aminofunctional hydrocarbon group is illustrated by groups having the formula $-R^1NHR^2$ or $-R^1NHR^1NHR^2$ wherein each $R^1$ is independently a divalent hydrocarbon radical having at least 2 carbon atoms and $R^2$ is hydrogen or an alkyl group. Each $R^1$ is typically an alkylene radical having from 2 to 20 carbon atoms. $R^1$ is illustrated by $-CH_2CH_2-$, $-CH_2CH_2CH_2-$, $-CH_2CHCH_3-$, $-CH_2CH_2CH_2CH_2-$ $-CH_2CH(CH_3)CH_2-$, $-CH_2CH_2CH_2CH_2CH_2-$, $-CH_2CH_2CH_2CH_2CH_2CH_2-$ $-CH_2CH_2CH(CH_2CH_3)CH_2CH_2CH_2-$, $-CH_2CH_2CH_2CH_2CH_2CH_2CH_2CH_2-$, $-CH_2CH_2CH_2CH_2CH_2CH_2CH_2CH_2CH_2CH_2-$. The alkyl groups $R^2$ are as illustrated above for R. When $R^2$ is an alkyl group it is typically methyl.

Typical aminofunctional hydrocarbon groups are $-CH_2CH_2NH_2$, $-CH_2CH_2CH_2NH_2$, $-CH_2CHCH_3NH$, $-CH_2CH_2CH_2CH_2NH_2$, $-CH_2CH_2CH_2CH_2CH_2NH_2$, $-CH_2CH_2CH_2CH_2CH_2CH_2NH_2$, $-CH_2CH_2NHCH_3$, $-CH_2CH_2CH_2NHCH_3$, $-CH_2(CH_3)CHCH_2NHCH_3$, $-CH_2CH_2CH_2CH_2NHCH_3$, $-CH_2CH_2NHCH_2CH_2NH_2$, $-CH_2CH_2CH_2NHCH_2CH_2CH_2NH_2$, $-CH_2CH_2CH_2CH_2NHCH_2CH_2CH_2NH_2$, $-CH_2CH_2NHCH_2CH_2NHCH_3$, $-CH_2CH_2CH_2NHCH_2CH_2CH_2NHCH_3$, $-CH_2CH_2CH_2CH_2NHCH_2CH_2CH_2CH_2NHCH_3$, and $-CH_2CH_2NHCH_2CH_2NHCH_2CH_2CH_3$.

The aminofunctional silicone resins of this invention are illustrated by aminofunctional silicone resins comprising the units:

$((CH_3)_3SiO_{1/2})_a$ (i)

$(C_6H_5(CH_3)SiO_{2/2})_b$ (ii)

$((CH_3)RSiO_{2/2})_b$ where $R=-CH_2CH_2CH_2NH_2$ (iii)

$(C_6H_5SiO_{3/2})_c$, (iv)

aminofunctional silicone resins comprising the units:

$(C_6H_5(CH_3)SiO_{2/2})_b$ (i)

$((CH_3)RSiO_{2/2})_b$ where $R=-CH_2CH_2CH_2NH_2$ (ii)

$(C_6H_5SiO_{3/2})_c$, (iii)

aminofunctional silicone resins comprising the units:

$((CH_3)_3SiO_{1/2})_a$ (i)

$((CH_3)RSiO_{2/2})_b$ where $R=-CH_2CH_2CH_2NH_2$ (ii)

$(RSiO_{3/2})_c$ where $R=-CH_2CH_2CH_2NH_2$ (iii)

$(C_6H_5SiO_{3/2})_c$, (iv)

aminofunctional silicone resins comprising the units:

$((CH_3)_3SiO_{1/2})_a$ (i)

$((CH_3)RSiO_{2/2})_b$ where $R=-CH_2CH_2CH_2NH_2$ (ii)

$(C_6H_5SiO_{3/2})_c$ (iii)

aminofunctional silicone resin comprising the units $((CH_3)_3SiO_{1/2})_a$ (i)

$(CH_3)_2SiO_{2/2})_b$ (ii)

$((CH_3)RSiO_{2/2})_b$ where $R=-CH_2CH_2CH_2NH_2$ (iii)

$(C_6H_5SiO_{3/2})_c$ (iv)

aminofunctional silicone resin comprising the units:

$((CH_3)_2RSiO_{1/2})_a$ where $R=-CH_2(CH_3)CHCH_2NHCH_3$ (i)

$(CH_3)_2SiO_{2/2})_b$ (ii)

$(C_6H_5(CH_3)SiO_{2/2})_b$ (iii)

$(C_6H_5SiO_{3/2})_c$ (iv)

aminofunctional silicone resins comprising the units:

$((CH_3)_2RSiO_{1/2})_a$ where $R=-CH_2(CH_3)CHCH_2NHCH_3$ (i)

$(C_6H_5(CH_3)SiO_{2/2})_b$ (ii)

$(C_6H_5SiO_{3/2})_c$, (iii)

aminofunctional silicone resins comprising the units:

$((CH_3)RSiO_{2/2})_b$ where $R=-CH_2(CH_3)CHCH_2NHCH_3$ (i)

$(C_6H_5(CH_3)SiO_{2/2})_b$ (ii)

$(C_6H_5SiO_{3/2})_c$, (iii)

aminofunctional silicone resins comprising the units:

$((CH_3)_2RSiO_{1/2})_a$ where $R=-CH_2(CH_3)CHCH_2NHCH_3$ (i)

$(C_6H_5(CH_3)SiO_{2/2})_b$ (ii)

$(SiO_{4/2})_d$ (iii)

and
aminofunctional silicone resins comprising the units:

$((CH_3)_3SiO_{1/2})_a$ (i)

$(C_6H_5(CH_3)SiO_{2/2})_b$ (ii)

$((CH_3)RSiO_{2/2})_b$ where R=—$CH_2CH_2CH_2NH_2$ (iii)

$(C_6H_5SiO_{3/2})_c$ (iv)

$(SiO_{4/2})_d$ (v)

wherein a, b, c, and d are as defined above.

In the aminofunctional silicone resin a has a typical value of 0.1 to 0.3, b has a typical value of 0.2 to 0.4, c has a typical value of 0.2 to 0.5, d has a typical value of 0. Generally, 10 to 30 mole percent of silicon atoms contain aminofunctional hydrocarbon groups in units (i), (ii) or (iii), the —NH— equivalent weight of the aminofunctional silicone resin is generally from 100 to 1500, alternatively from 100 to 1000, alternatively from 150 to 350, generally 20 to 50 weight percent of unit (ii) is present in the aminofunctional silicone resin, generally from 0 to 5 weight percent of unit (ii) are $Me_2SiO_{2/2}$ units in the aminofunctional silicone resin, and generally from 50 to 75 weight percent of silicon-bonded R groups are silicon-bonded aryl groups.

Generally, the aminofunctional silicone resins of this invention were prepared by hydrolytic polycondensation of alkoxysilanes by one of two methods. In some cases, the hydrolysis of the non-aminofunctional alkoxysilanes was accomplished via catalysis with strong acid, followed by addition of the aminofunctional silanes and base-catalyzed equilibration of these species to yield the aminofunctional silicone resin. In other cases, the entire hydrolysis was run under base-catalyzed conditions with the aminofunctional alkoxysilane(s) present from the start. In both cases, the hydrolysis was followed by distillative removal of by-product alcohol, filtration and removal of solvent to provide the product.

The aminofunctional silicone resins of this invention can also be manufactured by hydrolyzing 20-50 wt % of aryltrialkoxysilane and/or arylalkyldialkoxysilane, catalyzed by 0-0.05 wt % with trifluoromethanesulfonic acid (TFMSA), with deionized water (0-10 wt %), followed by distillative removal of by-product alcohol. Up to 35 wt % of hexamethyldisiloxane (HMDS), up to 10% wt % water, and optionally up to 40 wt % toluene is added and the mixture heated to 50-60° C. optionally followed by distillative removal of volatiles. Up to 20 wt % of γ-aminoalkyltrialkoxysilane (APTES) or γ-aminoalkyldialkoxyalkylsilane are added along with up to 10 wt % water, followed by distillative removal of alcohol. Up to 40 wt % of toluene (if it was not added earlier) is added, up to 10 wt % of water, and optionally a catalytic amount (to make 0-0.1 wt % KOH) of 1.0 N aqueous potassium hydroxide is added and water removed via azeotrope. If added, the hydroxide was neutralized with 1.0 N aqueous HCl or acetic acid, and water again removed via azeotrope. The mixture was filtered and solvent removed to yield the aminofunctional silicone resin. Typically the aryl group is phenyl, the alkyl group is methyl, the alkoxy group is either methoxy or ethoxy, and the amino group is the aminofunctional hydrocarbon group described above.

The aminofunctional silicone resins of this invention can also be manufactured by preparing a mixture of aryltrialkoxysilane and arylalkyldialkoxysilane optionally dissolved in xylenes and hydrolyzed with deionized water, followed by distillative removal of by-product alcohol. The resulting product is then reacted with cyclosilazane. The mixture is filtered and solvent removed to yield the silicone resin. Typically the aryl group is phenyl, the alkyl group is methyl, the alkoxy group is either methoxy or ethoxy, and the amino group is the aminofunctional hydrocarbon group described above.

Component (C) the organic hardener, is typically any multifunctional primary or secondary polyamines and their adducts, anhydrides, or polyamides. The organic hardener can be any compound with an active group capable of reacting with the acrylate or isocyanate group. It can be selected from compounds with amino, acid, anhydride or azide group. The organic hardener is illustrated by an aromatic diamine such as a diaminodiphenyl-sulfone, a methylenedianiline such as 4,4'-methylenedianiline, a diaminodiphenylether, benzidine, 4,4'-thiodianiline, 4-methoxy-6-m-phenylenediamine, 2,6-diaminopyridine, 2,4-toluenediamine, and dianisidine. Alicyclic amines such as menthane diaamine and heterocyclic amines such as pyridine may also be employed. In some cases, aliphatic amines such as secondary alkylamines which are normally fast reacting hardeners can be used alone or in combination with other organic hardeners provided the concentration and/or curing temperature are sufficiently low to permit control of the curing rate. Some commercial organic hardeners are illustrated by Versamine® C-30 is a cycloaliphatic amine curing agent sold by Cognis (Cincinnati, Ohio) and Dytek® EP is an aliphatic amine curing agent sold by DuPont, (Wilmington, Del.).

As used herein, cure rate modifier is any material that affects the cure time of the coating composition and includes cure accelerators, cure inhibitors, and cure catalysts. The cure rate modifier of Component (D) can be a compound that accelerates the reaction between acrylate or isocyanate groups in Component (A) and active groups in the hardener. Examples include phosphine compounds, such as tributylphosphine, triphenylphosphine, tris(dimethoxyphenyl) phosphine, tris(hydroxypropyl)phosphine and tris(cyanoethyl)phosphine; phosphonium salts, such as tetraphenylphosphonium tetraphenylborate, methyltributylphosphonium tetraphenylborate and methyltricyanoethyl phosphonium tetraphenylborate; imidazoles, such as 2-methyl imidazole, 2-phenyl imidazole, 2-ethyl-4-methyl imidazole, 2-undecyl imidazole, 1-cyanoethyl-2-methyl imidazole, 1,4-dicyano-6-[2-methylimidazolyl-(1)]-ethyl-S-triazine and 2,4-dicyano-6-[2-undecylimidazolyl-(1)]-ethyl-S-triazine; imudazolium salts, such as 1-cyanoethyl-2-undecylimidazolium trimellitate, 2-methylimidazolium isocyanurate, 2-ethyl-4-methylimidazolium tetraphenylborate and 2-ethyl-1,4-imethylimidazolium tetraphenylborate; amines, such as 2,4,6-tris(dimethylaminomethyl)phenol, benzyl dimethylamine, tetramethylbutyl guanidine, N-methyl piperazine and 2-dimethylamino-1-pyrroline; ammonium salts, such as triethylammonium tetraphenylborate; diazabicyclo compounds, such as 1,5-diazabicyclo(5,4,0)-7-undecene, 1,5-diazabicyclo(4,3,0)-5-nonene and 1,4-diazabicyclo(2,2,2)-octane; and tetraphenylborates, phenol salts, phenol novolak salts and 2-ethylhexanoates of those diazabicyclo compounds, and alcohols such as resorcinol. Of these compounds tertiary amines, phosphine compounds, imidazole compounds, diazabicyclo compounds and their salts are typically used. Dicyandiamide and boron trifluoride may also be used.

The cure rate modifier Component (D) can also be illustrated by compounds having an aliphatic unsaturated bond, organophosphorous compounds, organosulflr compounds, nitrogen-containing compounds, and tin compounds. Examples of the compounds having an aliphatic unsaturated bond include propargyl alcohol, ene-yne compounds, and maleic esters such as dimethyl maleate. Examples of the organophosphorus compounds are triorganophosphines, diorganophosphines, organophosphones, and triorganophosphites. The organosulfur compounds include organomercaptanes, diorganosulfides, hydrogen sulfide, benzothiazole, and benzothiazole disulfite. The nitrogen-containing compounds include ammonia, primary, secondary or tertiary alkylamines, arylamines, urea, and hydrazine. The amines are illustrated by triethylamine, tributylamine, N-methylmorpholine, N-ethylmorpholine, 1,4diaza-bicylo-(2,2,2)-octane, N-cetyl dimethylamine, N-methyl-N'-dimethylaminoethylpiperazine, N,N-dimethylbenzylamine, N,N-dimethylcyclohexylamine, and 1,2-dimethylimidazole. Organic tin compounds may also be used and include such materials as the tin(II) salts of carboxylic acids such as tin(II) acetate, tin(II) octoate, tin(II) ethylhexoate and tin(II) laurate, as well as such materials as the dialkyl tin salts of carboxylic acids as exemplified by dibutyltindiacetate, dibutyltindilaurate, dibutyltimaleate, and dioctyltindiacetate. Such tin salts may be used either alone or as a complex with amidines such as amino pyridines, amino pyrimidines, hydrazino pyridines, and tetrahydropyrimidines. Other metal-based compounds such as lead, iron, mercury, bismuth, cobalt and manganese also may be used, and include compounds such as cobalt(III) acetylacetonate, cobalt naphthoate, manganese naphthoate, lead oleate, zinc naphthenate and zirconium naphthenate. Other compounds such as silaamines and basic nitrogen compounds such as tetraaylammonium hydroxide, alkali metal hydroxides such as sodium hydroxide, and alkali metal alcoholates such as sodium methylate may also be used. The cure rate modifiers of component (D) are generally used in an amount from about 0.01 to about 10% by weight, preferably from about 0.05 to about 1.0% by weight, based on the quantity of polyisocyanate and the quantity of materials reacting with the polyisocyanate.

Compositions of the present invention may further comprise other components that are conventionally employed in polymerizable systems. These components include, but are not limited to, plasticizers, pigments, colorants, dyes, surfactants, thickeners, heat stabilizers, leveling agents, anti-cratering agents, fillers, sedimentation inhibitors, ultraviolet-light absorbers, and the like. Additives such as promoters, heat stabilizers, ultraviolet-light absorbers, etc. may be intimately dispersed in the reaction mixture and apparently thereby become an integral part of the polymer. Preferred antioxidants are sterically hindered phenolic compounds. Stabilizers such as organic phosphites are also useful. Preferred UV inhibitors are benzotriazole compounds.

The coating compositions of this invention can further comprise at least one filler illustrated by hollow microsperes, fumed silica, precipitated silica, silicic anhydride, hydrous silicic acid, carbon black, ground quartz, calcium carbonate, magnesium carbonate, diatomaceous earth, wollastonite, calcined clay, clay, talc, kaolin, titanium oxide, bentonite, ferric oxide, zinc oxide, glass balloon, glass beads, mica, glass powder, glass balloons, coal dust, acrylic resin powder, phenolic resin powder, ceramic powder, zeolite, slate powder, organic fibers, and inorganic fibers.

In the coating compositions of this invention the —NH— (amine H) equivalent weight to acrylate or isocyanate equivalent weight ratio is typically fiom 0.8:1-1.2:1.

The coating compositions of this invention may be prepared by mixing (or mechanically agitating) components (A) and (B), and any optional components, to form a homogenous mixture. This may be accomplished by any convenient mixing method known in the art exemplified by a spatula, mechanical stirrers, in-line mixing systems containing baffles and/or blades, powered in-line mixers, homogenizers, a drum roller, a three-roll mill, a sigma blade mixer, a bread dough mixer, and a two roll mill. The order of mixing is not considered critical. Components (A) and (B) and any optional components, may be pre-mixed and applied or mixed during application if tack free time is short The coating compositions of this invention are useful as a stand alone coating or as ingredients in flame retardant coating compositions, fabric or fiber coating compositions, UV resistant coating compositions, paint formulations, powder coatings, architectural coatings and adhesives. The coating compositions of this invention have enhanced flexibility and gloss, particularly when used in coatings, paints, powder coatings, architectural coatings, and adhesives.

This invention further relates to a coating composition obtained by a method comprising reacting (A) 100 weight parts of (i) at least one compound containing at least one acrylate group or (ii) at least one compound containing at least one isocyanate group; (B) 3-300 weight parts of at least one aminofunctional silicone resin comprising the units:

$(R_3SiO_{1/2})_a$ (i)

$(R_2SiO_{2/2})_b$ (ii)

$(RSiO_{3/2})_c$ (iii) and

$(SiO_{4/2})_d$ (iv)

wherein R is independently an alkyl group, an aryl group, or an aminofunctional hydrocarbon group, a has a value of less than 0.4, b has a value of zero or greater than zero, c has a value of greater than zero to 0.7, d has a value of less than 0.3, the value of $a+b+c+d=1$, with the provisos that 3 to 50 mole percent of silicon atoms contain aminofunctional hydrocarbon groups in units (i), (ii) or (iii), the —NH— equivalent weight of the aminofunctional silicone resin is from 100 to 1500, alternatively from 100 to 1000, alternatively from 150 to 350, the aminofunctional silicone resin is in the form of a neat liquid, solution, or meltable solid, greater than 20 weight percent of unit (ii) is present in the aminofunctional silicone resin, less than 10 weight percent of unit (ii) are $Me_2SiO_{2/2}$ units in the aminofunctional silicone resin, and greater than 50 weight percent of silicon-bonded R groups are silicon-bonded aryl groups, and at least 30 weight percent of all silicon atoms contain an aryl group; (C) up to 300 weight parts of at least one organic hardener; and (D) up to 5 weight parts of at least one cure rate modifier. "Reacting" as used herein means mixing components (A) and (B) and any optional components at room temperature (20-25° C.) or heating a mixture comprising components (A) and (B) and any optional components to temperatures above room temperature such as at temperatures of up to 200° C. Components (A)-(E) are as described above.

EXAMPLES

Materials

Jeffamine D-230 is a polyoxypropylenediamine having an amine H (—NH—) equivalent weight of 56.2) sold by Huntsman (Salt Lake City, Utah).

CN 975 is a hexafunctional aromatic urethane acrylate sold by Sartomer (Exton, Pa.)

Tolonate XIDT 70SB is an isophorone diisocyanate trimer (70% solids, 12.3 wt % NCO) sold by Rhodia (Cranbury, N.J.).

The weight loss at 400° C. was reported. The uncertainty was estimated to be ±5% based on duplicate analysis.

Aminofunctional Silicone Resins B1-B3 were prepared in the following manner. Phenyltrimethoxysilane and/or phenylmethyldimethoxysilane, catalyzed by trifluoromethanesulfonic acid (TFMSA), were hydrolyzed with deionized water, followed by distillative removal of by-product alcohol. Hexamethyldisiloxane (HMDS) and additional water were added and the mixture heated to 50-60° C. optionally followed by distillative removal of volatiles. γ-Aminopropyltriethoxysilane (APTES) or γ-aminopropyldiethoxymethylsilane (APDEMS) were added along with additional water, followed by distillative removal of alcohol. Toluene, additional water and optionally a catalytic amount of 1.0 N aqueous potassium hydroxide were added and water removed via azeotrope. If added the hydroxide was neutralized with 1.0 N aqueous HCl, and water again removed via azeotrope. The mixture was filtered and solvent removed. The amount of each ingredient is shown in Table 1 below. The final aminofunctional silicone resin composition, wt % phenyl (Ph), wt % $R_2SiO$ (D), wt % $Me_2SiO$ ($D(Me_2)$), mole percent amino (—$CH_2CH_2CH_2NH_2$), wt % amine (—$NH_2$), and —NH— (Amine H) equivalent weight are shown in Table 2 below.

TABLE 1

| Aminofunctional Silicone Resin | Weight (in grams) | | | | | | | | | |
|---|---|---|---|---|---|---|---|---|---|---|
| | $PhSi(OMe)_3$ | $PhMeSi(OMe)_2$ | APDEMS | HMDS | Toluene | Water | TFMSA | 1.0 N KOH | 1.0 N HCl | Yield (g) |
| B1 | 205.3 | | 88.0 | 78.4 | 117.6 | 72.5 | 0.14 | | | 242.4 |
| B2 | 208.4 | 57.5 | 40.2 | 44.8 | 165.3 | 75.7 | 0.12 | 4.7 | 4.6 | 239.5 |
| B3 | 208.2 | 38.3 | 80.4 | 35.8 | 167.2 | 79.5 | 0.12 | 4.7 | 4.6 | 184.5 |

TABLE 2

| Example | Aminofunctional Silicone Resin Comprising the Units: | Wt % Ph# | wt % D* | Mol % Amino | wt % Amine | —NH— Eq. Wt. |
|---|---|---|---|---|---|---|
| B1 | $M_{0.355}D^{NH2}_{0.198}T^{Ph}_{0.441}$ | 52.7 | 21.3 | 20 | 2.9 | 279 |
| B2 | $M_{0.246}D^{Ph}_{0.150}D^{NH2}_{0.099}T^{Ph}_{0.501}$ | 70.8 | 27.4 | 10 | 1.4 | 595 |
| B3 | $M_{0.194}D^{Ph}_{0.101}D^{NH2}_{0.197}T^{Ph}_{0.502}$ | 65.3 | 31.4 | 20 | 2.7 | 301 |

In Table 2 above:
molar mass of phenyl in the composition divided by the molar mass of all resin R groups in the composition
*based on the molar mass of the designated group divided by the molar mass of the composition
M denotes $(CH_3)_3SiO_{1/2}$
$D^{Ph}$ denotes $C_6H_5(CH_3)SiO_{2/2}$
$D^{NH2}$ denotes $(CH_3)RSiO_{2/2}$ where R = —$CH_2CH_2CH_2NH_2$
$T^{Ph}$ denotes $C_6H_5SiO_{3/2}$ TA-N is an acrylated fluorocarbon sold by DuPont (Wilington, Del.).

CN 111 is an epoxidized soybean oil acrylate sold by Sartomer (Exton, Pa.).

Test Methods

Thermogravimetric Analysis

Thermogravimetric analysis was performed using a TA Instruents (New Castle, Del.) TGA 2950. Approximately 7 to 12 mg of a single piece of the test specimen was placed in a Pt pan and heated to 1000° C. at 10° C./min under an air atmosphere and the weight loss continuously monitored and recorded.

Example 1

1 gram (g) of aminofunctional silicone resin B3 was syringed into an aluminum dish. 0.43 (g) of CN 975 was added using a 5 ml syringe and the materials were mixed well at room temperature using a wooden stir rod. The material became a tack free, transparent (apart from air bubbles) solid within 9 minutes of mixing. The material was a semi-rigid solid after holding overnight at room temperature. The material was analyzed by Thermogravimetric analysis in air and the results are displayed in Table 3.

Example 2

2 (g) of aminofunctional silicone resin B2 was syringed into an aluminum dish. 1.15 (g) of Tolonate XIDT 70SB was added using a 5 ml syringe and the materials were mixed well at room temperature using a wooden stir rod. The material gelled within 30 seconds and became a tack free, transparent (apart from air bubbles) solid within 36 minutes of mixing. The material was a semi-rigid solid after holding overnight at room temperature. The cured polyurea material was analyzed by Thermogravimetric analysis in air and the results are displayed in Table 3.

Comparison Example 1

0.86 (g) of Jeffamine D-230 was syringed into an aluminum dish. 2 (g) of CN 975 was added using a 5 ml syringe and the materials were mixed well at room temperature using a wooden stir rod. The material gelled within 30 seconds and became a tack free, transparent (apart from air bubbles), yellow solid within 5 hours of mixing. The material was a semi-rigid solid after holding overnight at room temperature. The material was analyzed by Thermogravimetric analysis in air and the results are displayed in Table 3.

Comparison Example 2

0.33 (g) of Jeffamine D-230 was syringed into an aluminum dish. 2 (g) of Tolonate XIDT 70SB was added using a 5 ml syringe and the materials were mixed well at room temperature using a wooden stir rod. The material became a tack free, transparent (apart from air bubbles), yellow solid within 3 minutes of mixing. The material was a rigid solid after holding overnight at room temperature. The material was analyzed by Thermogravimetric analysis in air and the results are displayed in Table 3.

Example 3

1.0 (g) of aminofunctional silicone resin B1 was syringed into an aluminum dish. 1.47 (g) of CN 111 was added using a 5 ml syringe and the materials were mixed well at room temperature using a wooden stir rod. The material was a transparent, soft solid after holding overnight at room temperature.

TABLE 3

Thermogravimetric Analysis Results

| | Example 1 | Example 2 | Comparison Example 1 | Comparison Example 2 |
|---|---|---|---|---|
| Temp @10% Wt Loss | 385° C. | 325° C. | 315° C. | 177° C. |
| Temp @50% wt loss | 620° C. | 600° C. | 415° C. | 355° C. |
| 500° C. Wt Loss % (in air) | 35.1% | 41.1% | 79.6% | 89.7% |

Examples 1-3 show the utility of aminofunctional silicone resins with acrylate compounds and isocyanate compounds to enable fast curing thermal resistant thermoset coating compositions.

Example 4

309.5 (g) of phenyltrimethoxysilane and 142.0 (g) of trimethylethoxysilane were hydrolyzed with 105.8 (g) of 1 wt % aqueous HCl followed by distillative removal of by-product alcohol. 285.6 (g) of toluene was added and excess water removed via azeotrope. 53.1 (g) of γ-aminopropyltriethoxysilane (APTES) was added and the mixture heated to 70° C. for two hours. The product mixture was filtered and solvent removed to yield 602.0 (g) of product. Composition by NMR was: $M_{0.372}T^{NH2}_{0.074}T^{Ph}_{0.554}$.

30.18 (g) of this aminofunctional silicone resin was preheated to 100° C. in an oven and poured into a 100 ml 3 neck reaction flask. 22.50 (g) of TA-N was pre-heated to 100° C. and added to the flask and the contents were stirred under nitrogen purge for 1 hour at 60° C. using a oil bath and air powered stirrer to maintain temperature and steady mixing. The temperature was increased to 120° C. for 1 hour and the light yellow liquid was poured into a 4 oz jar and allowed to cool to a highly viscous hazy white liquid. The resulting material was a meltable and dispersible fluorocarbon grafted silicone resin.

Example 4 shows the utility of aminofunctional silicone resins as a starting material for grafted copolymers using monofunctional acrylate (or isocyanate) organic materials to graft onto the silicone resin to form a resin liquid or meltable solid.

The invention claimed is:

1. A coating composition comprising:
   (A) 100 weight parts of (i) at least one compound containing at least one acrylate group or (ii) at least one compound containing at least one isocyanate group;
   (B) 3-300 weight parts of at least one aminofunctional silicone resin comprising the units:

$(R_3SiO_{1/2})_a$ (i)

$(R_2SiO_{2/2})_b$ (ii)

$(RSiO_{3/2})_c$ (iii) and $(SiO_{4/2})_d$ (iv)

wherein R is independently an alkyl group, an aryl group, or an aminofunctional hydrocarbon group, a has a value of less than 0.4, b has a value of zero or greater than zero, c has a value of greater than zero to 0.7, d has a value of less than 0.3, the value of a+b+c+d=1, with the provisos that 3 to 50 mole percent of silicon atoms contain aminofunctional hydrocarbon groups in units (i), (ii) or (iii), the —NH— equivalent weight of the aminofunctional silicone resin is from 100 to 1500, the aminofunctional silicone resin is in the form of a neat liquid, solution, or meltable solid, greater than 20 weight percent of unit (ii) is present in the aminofunctional silicone resin, less than 10 weight percent of unit (ii) are $Me_2SiO_{2/2}$ units in the aminofunctional silicone resin, and greater than 50 weight percent of silicon-bonded R groups are silicon-bonded aryl groups, and at least 30 weight percent of all silicon atoms contain an aryl group;
   (C) up to 300 weight parts of at least one organic hardener; and
   (D) up to 5 weight parts of at least one cure rate modifier.

2. A composition according to claim 1, wherein component (A) is selected from urethane acrylates, acrylated fluorocarbons, soybean oil acrylates, epoxy acrylates, pentaerythritol triacrylate, glycidyl acrylate, isophorone diisocyanate trimers, isophorone diisocyanate, toluene diisocyanate, polyisocyanates, tetramethylxylylene diisocyanate, phenylene diisocyanate, xylene diisocyanate, 1,5-naphthalene diisocyanate, chlorophenylene 2,4-diisocyanate, bitoluene diisocyanate, dianisidine diisocyanate, toluidine diisocyanate, alkylated benzene diisocyanates, methylene-diphenyl-diisocyanate, 3,3'-dimethyl-4,4'-diphenyl-methane diisocyanate, cyclohexylene diisocyanate, 4,4'-methylenedicyclohexyl diisocyanate, tetramethylxylyl diisocyanates, $OCN-C(CH_3)_2-C_6H_4C(CH_3)_2-NCO$, isophorone diisocyanate, 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate, or 2-methyl-1,5-pentamethylene diisocyanate.

3. A composition according to claim 1 wherein R is independently selected from methyl, phenyl, or an aminofunctional hydrocarbon group having the formula $-R^1NHR^2$ or $-R^1NHR^1NHR^2$ wherein each $R^1$ is independently a divalent hydrocarbon radical having at least 2 carbon atoms and $R^2$ is hydrogen or an alkyl group.

4. A composition according to claim 1 wherein Component (B) is selected from
aminofunctional silicone resins comprising the units:

$((CH_3)_3SiO_{1/2})_a$ (i)

$(C_6H_5(CH_3)SiO_{2/2})_b$ (ii)

$((CH_3)RSiO_{2/2})_b$ where $R=-CH_2CH_2CH_2NH_2$ (iii)

$(C_6H_5SiO_{3/2})_c$, (iv)

aminofunctional silicone resins comprising the units:

$(C_6H_5(CH_3)SiO_{2/2})_b$ (i)

$((CH_3)RSiO_{2/2})_b$ where $R=-CH_2CH_2CH_2NH_2$ (ii)

$(C_6H_5SiO_{3/2})_c$, (iii)

aminofunctional silicone resins comprising the units:

$((CH_3)_3SiO_{1/2})_a$ (i)

$((CH_3)RSiO_{2/2})_b$ where $R=-CH_2CH_2CH_2NH_2$ (ii)

$(RSiO_{3/2})_c$ where $R=-CH_2CH_2CH_2NH_2$ (iii)

$(C_6H_5SiO_{3/2})_c$, (iv)

aminofunctional silicone resins comprising the units:

$((CH_3)_3SiO_{1/2})_a$ (i)

$((CH_3)RSiO_{2/2})_b$ where $R=-CH_2CH_2CH_2NH_2$ (ii)

$(C_6H_5SiO_{3/2})_c$ (iii)

or
aminofunctional silicone resins comprising the units:

$((CH_3)_3SiO_{1/2})_a$ (i)

$(C_6H_5(CH_3)SiO_{2/2})_b$ (ii)

$((CH_3)RSiO_{2/2})_b$ where $R=-CH_2CH_2CH_2NH_2$ (iii)

$(C_6H_5SiO_{3/2})_c$ (iv)

$(SiO_{4/2})_d$ (v)

wherein a, b, c, and d are as defined above.

5. A composition according to claim 1 wherein a has a value of 0.1 to 0.3, b has a value of 0.2 to 0.4, c has a value of 0.2 to 0.5, d has a value of 0, 10 to 30 mole percent of silicon atoms contain aminofunctional hydrocarbon groups in units (i), (ii) or (iii), the —NH— equivalent weight of the aminofunctional silicone resin is from 150 to 350, 20 to 50 weight percent of unit (ii) is present in the aminofunctional silicone resin, 0 to 5 weight percent of unit (ii) are $Me_2SiO_{2/2}$ units in the aminofunctional silicone resin, and from 50 to 75 weight percent of silicon-bonded R groups are silicon-bonded aryl groups.

6. A composition according to claim 1 wherein Component (C) is selected from multifunctional primary polyamines, multifunctional secondary polyamines, adducts of multifunctional primary polyamines, adducts of multifunctional secondary polyamines, anhydrides, or polyamides.

7. A composition according to claim 1 wherein Component (D) is selected from tertiary amines, phosphine compounds, imidazole compounds, diazabicyclo compounds, and their salts.

8. A composition according to any of claim 1, wherein the composition further comprises at least one ingredient selected from plasticizers, pigments, colorants, dyes, surfactants, thickeners, heat stabilizers, leveling agents, anti-cratering agents, fillers, sedimentation inhibitors, ultraviolet-light absorbers, promoters, antioxidants, ultraviolet-light inhibitors, or fillers.

9. A composition according to claim 1 wherein the —NH— (amine H) equivalent weight to acrylate or isocyanate equivalent weight ratio is typically from 0.8:1-1.2:1.

10. A coating composition obtained by a method comprising reacting:
(A) 100 weight parts of (i) at least one compound containing at least one acrylate group or (ii) at least one compound containing at least one isocyanate group;
(B) 3-300 weight parts of at least one aminofunctional silicone resin comprising the units:

$(R_3SiO_{1/2})_a$ (i)

$(R_2SiO_{2/2})_b$ (ii)

$(RSiO_{3/2})_c$ (iii) and $(SiO_{4/2})_d$ (iv)

wherein R is independently an alkyl group, an aryl group, or an aminofunctional hydrocarbon group, a has a value of less than 0.4, b has a value of greater than 0.15, c has a value of greater than zero to 0.7, d has a value of less than 0.2, the value of a+b+c+d=1, with the provisos that 3 to 50 mole percent of silicon atoms contain aminofunctional hydrocarbon groups in units (i), (ii) or (iii), the —NH— equivalent weight of the aminofunctional silicone resin is from 100 to 1500, the aminofunctional silicone resin is in the form of a neat liquid, solution, or meltable solid, greater than 20 weight percent of unit (ii) is present in the aminofunctional silicone resin, less than 10 weight percent of unit (ii) are $Me_2SiO_{2/2}$ units in the aminofunctional silicone resin, and greater than 50 weight percent of silicon-bonded R groups are silicon-bonded aryl groups;
(C) up to 300 weight parts of at least one organic hardener; and
(D) up to 5 weight parts of at least one cure rate modifier.

11. A composition according to claim 1 wherein the —NH— equivalent weight of the aminofunctional silicone resin is from 100 to 1000.

12. A composition according to claim 11, wherein component (A) is selected from urethane acrylates, acrylated fluorocarbons, soybean oil acrylates, epoxy acrylates, pentaerythritol triacrylate, glycidyl acrylate, isophorone diisocyanate trimers, isophorone diisocyanate, toluene diisocyanate, polyisocyanates, tetramethylxylylene diisocyanate, phenylene diisocyanate, xylene diisocyanate, 1,5-naphthalene diisocyanate, chlorophenylene 2,4-diisocyanate, bitoluene diisocyanate, dianisidine diisocyanate, toluidine diisocyanate, alkylated benzene diisocyanates, methylene-diphenyl-diisocyanate, 3,3'-dimethyl-4,4'-diphenyl-methane diisocyanate, cyclohexylene diisocyanate, 4,4'-methylenedicydohexyl diisocyanate, tetramethylxylyl diisocyanates, $OCN-C(CH_3)-{}_6H_4C(CH_3)_2-NCO$, isophorone diisocyanate, 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate, or 2-methyl-1,5-pentamethylene diisocyanate.

13. A composition according to claim 11 wherein R is independently selected from methyl, phenyl, or an aminofunctional hydrocarbon group having the formula $-R^1NHR^2$ or $-R^1NHR^1NHR^2$ wherein each $R^1$ is independently a divalent hydrocarbon radical having at least 2 carbon atoms and $R^2$ is hydrogen or an alkyl group.

14. A composition according to claim 11 wherein Component (B) is selected from aminofunctional silicone resins comprising the units:

$((CH_3)_3SiO_{1/2})_a$     (i)

$(C_6H_5(CH_3)SiO_{2/2})_b$     (ii)

$((CH_3)RSiO_{2/2})_b$ where $R=-CH_2CH_2CH_2NH_2$     (iii)

$(C_6H_5SiO_{3/2})_c$,     (iv)

aminofunctional silicone resins comprising the units:

$(C_6H_5(CH_3)SiO_{2/2})_b$     (i)

$((CH_3)RSiO_{2/2})_b$ where $R=-CH_2CH_2CH_2NH_2$     (ii)

$(C_6H_5SiO_{3/2})_c$,     (iii)

aminofunctional silicone resins comprising the units:

$((CH_3)_3SiO_{1/2})_a$     (i)

$((CH_3)RSiO_{2/2})_b$ where $R=-CH_2CH_2CH_2NH_2$     (ii)

$(RSiO_{3/2})_c$ where $R=-CH_2CH_2CH_2NH_2$     (iii)

$(C_6H_5SiO_{3/2})_c$,     (iv)

aminofunctional silicone resins comprising the units:

$((CH_3)_3SiO_{1/2})_a$     (i)

$((CH_3)RSiO_{2/2})_b$ where $R=-CH_2CH_2CH_2NH_2$     (ii)

$(C_6H_5SiO_{3/2})_c$     (iii)

or
aminofunctional silicone resins comprising the units:

$((CH_3)_3SiO_{1/2})_a$     (i)

$(C_6H_5(CH_3)SiO_{2/2})_b$     (ii)

$((CH_3)RSiO_{2/2})_b$ where $R=-CH_2CH_2CH_2NH_2$     (iii)

$(C_6H_5SiO_{3/2})_c$     (iv)

$(SiO_{4/2})_d$     (v)

wherein a, b, c, and d are as defined above.

15. A composition according to claim 11 wherein Component (C) is selected from multifunctional primary polyamines, multifunctional secondary polyamines, adducts of multifunctional primary polyamines, adducts of multifunctional secondary polyamines, anhydrides, or polyamides.

16. A composition according to claim 11 wherein Component (D) is selected from tertiary amines, phosphine compounds, imidazole compounds, diazabicyclo compounds, and their salts.

17. A composition according to claim 11, wherein the composition further comprises at least one ingredient selected from plasticizers, pigments, colorants, dyes, surfactants, thickeners, heat stabilizers, leveling agents, anti-cratering agents, fillers, sedimentation inhibitors, ultraviolet-light absorbers, promoters, antioxidants, ultraviolet-light inhibitors, or fillers.

18. A composition according to claim 11, wherein the —NH— (amine H) equivalent weight to acrylate or isocyanate equivalent weight ratio is typically from 0.8:1-1.2:1.

19. A coating composition according to claim 10 wherein the —NH— equivalent weight of the aminofunctional silicone resin is from 100 to 1000.

* * * * *